Patented Apr. 21, 1925.

1,534,456

UNITED STATES PATENT OFFICE.

ALLEN G. McKINNON, OF ANDOVER, MASSACHUSETTS, ASSIGNOR TO BOSTON RUBBER SHOE COMPANY, OF MALDEN, MASSACHUSETTS, A CORPORATION OF MASSACHUSETTS.

COMPOSITE RUBBER AND LEATHER MATERIAL AND METHOD OF MAKING THE SAME.

No Drawing. Application filed June 5, 1923. Serial No. 643,555.

*To all whom it may concern:*

Be it known that I, ALLEN G. MCKINNON, a citizen of the United States, residing at Andover, county of Essex, and State of Massachusetts, have invented certain new and useful Improvements in Composite Rubber and Leather Materials and Methods of Making the Same, of which the following is a full, clear, and exact description.

This invention relates to a composite rubber and leather material and to the method of making the same, more particularly as applied to an improved finish for leather.

There is a wide field of use in the arts for a rubberized or rubber finished leather, and a number of methods have been devised for making such a material. Owing to the nature of the components, however, and to the necessary steps required in making the material great difficulty has been found in securing satisfactory results. If the ordinary soft cured rubber be used for the finish and applied as a thin sheet it is lacking in toughness and hardness and is therefore easily snagged or torn. It is essential that there be an intimate bond between the rubber and leather, and this cannot be secured satisfactorily except by the vulcanizing process. Ordinary leather contains a considerable amount of animal fats and oils, which latter have an injurious effect on the rubber and prevent the securing of a good and permanent bond between the rubber and leather. As the result a number of processes have been devised in which a leather is used from which these oils and fats have been removed. However, such leathers are harsh and lacking in pliability and serious difficulties have arisen in vulcanizing the rubber to them. As far as I am aware the usual vulcanizing methods requiring the rather high heat of 280° F. or more have been employed prior to my invention, and when using such a vulcanizing heat the steam or wet cure can not be employed since the steam in conjunction with the sulphur dioxide generated injures the leather to such an extent as to render it useless. However, even if a dry heat be employed the degreased leather is more or less hydroscopic and as a result enough moisture is present to injuriously affect the leather at the elevated vulcanizing temperatures used.

An object of my invention is to provide an improved composite article of rubber and leather.

Another object is to provide a water proof finish for leather.

Still another object is to provide a cheap leather having the appearance and finish of a high grade one.

A further object is to provide a flexible, tough and hard surface finish for leather.

A still further object is to provide a method for producing an article having the above characteristics.

The method for producing the article comprises broadly adhesively uniting a sheet of rubber and leather, either with or without the aid of cement, embossing the composite sheet if desired, curing by the aid of a cold cure accelerator, and finally imparting a superficial hardness and slip to the rubber.

In carrying out the invention any suitable leather for the purpose may be provided, and for many uses a cheap and good leather is that known as a chrome tanned split. Whatever the nature of the leather selected it is first treated to remove all animal oils and fats, and then stuffed with a small percentage of some non-oxidizing oil, such as castor oil, which has no injurious effect on the rubber and which will at the same time render the leather soft and pliable. The rubber used is in the form of thin sheets of a good quality compound and containing as a curative agent some one of the well known cold cure accelerators. A sheet of the rubber is laid upon a smooth surface, such as metal, from which the rubber may be readily stripped, and the piece of leather is then placed on the rubber sheet and rolled down at all points to thoroughly unite the two. In some cases it may be desirable to first apply one or more coats of cement to the leather, and in this event it is preferred to use a cement made from the same rubber stock as that contained in the sheet to be applied. After the rubber sheet and leather have been united the composite sheet is stripped from the metal or other surface and if a grain effect is desired it may be embossed in any suitable manner such as by the use of an ordinary plate embossing press. The cold cure accelerator is then set off and the material allowed to vulcanize if desired at ordinary temperatures. However, in order to save time it is preferable to heat the material for a limited time and to a temperature which will vary according to the nature of the stock, the accelerator used, the extent of cure desired or other conditions. This temperature may be as high as 200° F. but should not exceed 212° F. owing to the injurious action of the steam formed on the leather, as previously stated. After curing, the surface of the rubber is then subjected to what is known as the "brominating process," in which the rubber is given a superficial treatment with a dilute solution of bromine in a suitable volatile solvent such as carbon tetra chloride. For most purposes a 1½% solution of the bromine is suitable, and the rubber may be washed one or more times with this solution depending upon the effect desired. The action of the bromine is to harden the surface and impart a lustre and slip or non-frictional feel to the touch. The effect of the bromine is of course, greatest at the surface and extending to the interior of the rubber sheet in a gradually lessening degree. As a result the brominated surface is not in the nature of an ordinary varnish or other finish which forms a distinct layer and is liable to crack or peel, but instead forms an integral part of the rubber sheet, and the latter is securely bonded to the leather by vulcanization. The non-frictional feel or slip and lustre are practically identical with those of ordinary finished leather. When using white or light colored rubber compounds the bromine treatment may be omitted as it tends to darken the material and the surface may be starched instead.

As one instance of the use of my invention it may be applied in making the tops of the rubber footwear articles known as "lumbermen's" which consist of a foot portion built up of the usual fabric and rubber and an upper or leg portion formed of leather. The tops of these articles, as formerly made, were not waterproof, and owing to the animal fats in the leather, they seriously injured the rubber portions of the article. In making the rubberized leather for the "lumbermen's" a sheet of rubber is laid on a plate as before and the cut to shape leather parts are then superposed on the rubber, rolled together, and the superfluous rubber cut away with a sharp knife. The rubber covered parts are then embossed if desired, cured and brominated as before described. By using for the tops rubber finished leather made according to my invention, a waterproof footwear article is obtained having all the advantages and none of the disadvantages of the prior ones. The rubber finish is very securely bonded to the leather and owing to the brominating treatment its outer surface is quite hard, tough and practically snag proof. In addition as the upper raw edge of the leather top is exposed it allows the leather to "breathe" to a certain extent thereby allowing the escape of perspiration. The above is but a single instance of the many applications of my improved article. By using a black compound a cheap split leather may be given a finish resembling that of patent leather, and various colored compounds may be used and variously embossed to imitate the grain of different leathers, and the material then used for any of the usual purposes of such leathers such as hand bags, brief cases, articles of baggage, various footwear articles and any other desired applications. For certain uses where it is desired merely to produce a composite sheet of rubber and leather the brominating step may of course be omitted.

It will be seen that by my invention a cheap leather such as splits, may be given a finish such that it will be readily taken for a high grade leather, and this finsh is durable, elastic, waterproof and for all practical purposes inseparable from the leather. Owing to the removal of the animal fats the leather has no injurious effect on the rubber, by reason of the stuffing with the castor oil or an equivalent material it remains soft and pliable, and by reason of the use of the cold cure accelerator the leather is not in any way injured as is necessarily the case with any leather subjected to the usual high temperature vulcanization.

While a specific disclosure of the invention has been made it is obvious that numerous changes may be made in the method and it is not desired to limit the invention otherwise than as set forth in the appended claims.

Having thus described my invention, what I claim and desire to protect by Letters Patent is:

1. As a new article of manufacture, leather having a finishing coating of superficially hardened, toughened and glossed vulcanized rubber.

2. As a new article of manufacture, leather having a finishing coating of superficially brominated rubber.

3. As a new article of manufacture, leather having an imitation leather finished surface of vulcanized and superficially brominated rubber.

4. As a new article of manufacture, leather having an imitation leather waterproof finish of relatively cold vulcanized superficially brominated rubber.

5. As a new article of manufacture, split leather having relatively cold vulcanized thereon an imitation leather waterproof finish of superficially brominated rubber.

6. As a new article of manufacture, a degreased leather impregnated with a non-oxidizing vegetable oil and having a thin exterior finish of rubber attached thereto by vulcanization.

7. The method of forming a composite leather and rubber material which comprises disposing a layer of vulcanizable material on the leather and curing by the aid of a cold cure accelerator below 212° F.

8. The method of finishing leather which comprises covering it with a thin layer of vulcanizable material, curing by the aid of a cold cure accelerator, and superficially treating it to impart a slip thereto.

9. The method of finishing leather which comprises superposing upon it a thin layer of vulcanizable material, curing by the aid of a cold cure accelerator, and imparting a superficial hardness and slip by treatment with a halogen.

10. The method of finishing leather which comprises superposing upon it a thin layer of vulcanizable material, curing by the aid of a cold cure accelerator, and imparting a superficial hardness and slip by treatment with bromine.

11. The method of finishing leather which comprises superposing upon it a thin layer of vulcanizable material, embossing, curing by the aid of a cold cure accelerator, and superficially treating it with a solution of bromine.

12. The method of finishing leather which comprises degreasing the leather, impregnating it with a vegetable oil, superposing upon it a thin layer of vulcanizable material, and curing at a relatively low temperature.

13. The method of finishing leather which comprises degreasing the leather, impregnating it with a non-oxidizing vegetable oil, superposing upon it a thin layer of vulcanizable material, embossing, and curing at a relatively low temperature.

14. The method of finishing leather which comprises degreasing the leather, impregnating it with a vegetable oil, superposing upon it a thin layer of vulcanizable material, curing at a relatively low temperature, and imparting a superficial slip and hardness by treating with a halogen.

15. The method of finishing leather which comprises degreasing the leather, impregnating it with a non-oxidizing vegetable oil, impressing upon it a thin layer of vulcanizable material, curing at a relatively low temperature, and superficially treating it with bromine.

16. The method of finishing leather which comprises degreasing the leather, impregnating it with castor oil, joining to it by pressure a layer of vulcanizable material, embossing, curing by the aid of a cold cure accelerator, and superficially treating it with a solution of bromine.

Signed at Andover, county of Essex, and State of Massachusetts, this 31st day of May, 1923.

ALLEN G. McKINNON.